Patented Oct. 20, 1942

2,299,593

UNITED STATES PATENT OFFICE 2,299,593

METHOD OF MAKING CLOSED CELL EXPANDED RUBBER BY INTERNALLY DEVELOPED GASES

Dudley Roberts, New York, Roger Charles Bascom, Merrick, N. Y., and Lester Cooper, Monson, Mass., assignors to Rubatex Products, Inc., New York, N. Y., a corporation of Delaware No Drawing. Application August 18, 1937, Serial No. 159,706

20 Claims. (Cl. 260—724)

Our invention relates to a novel closed cell gas expanded rubber and a process of making the same by means of an internally developed gas and by controlling the conditions of the rubber with respect to the time of the release of the gas.

The term rubber is to be construed broadly as including compounded or uncompounded rubber, rubber in the form of or derived from naturally occurring rubber dispersions or from artificially prepared rubber dispersions and whether or not such dispersions contain additional ingredients.

Sponge rubber is an open celled gas expanded rubber with inter-communicating channels extending throughout. Closed cell gas expanded rubber consists of a mass of rubber containing enclosed cells of gas sealed in films of rubber. There is no communication between the cells and no communication to the outside air.

Sponge rubber, made by mixing with a rubber dough chemicals adapted by reaction to evolve gas, has long been known. This rubber was made by incorporating throughout a highly plasticized rubber dough chemicals such as sodium bicarbonate which under heat reacted with acid present to release carbon dioxide. The gas so evolved in the rubber dough expanded the rubber and formed inter-communicating channels throughout giving a sponge-like structure similar to natural sponge. Although such sponges are good substitutes for natural bath sponges, for many purposes they have serious faults.

Conventional sponge rubber has many disadvantages due to the physical characteristics of the material itself. Sponge rubber, for example absorbs water, other liquids and gases, secondly it deteriorates more rapidly than the closed cell-type material because of greater surface exposure, thirdly it lacks resilience, fourthly it is distinctly a more dense material, fifthly it requires greater amount of compression to give equal sealing effect compared with gas expanded cell-tite rubber and therefore a greater volume of conventional sponge rubber is required to accomplish a sealing effect equal to that of gas expanded closed cell rubber; sixthly it lacks buoyancy in water, and seventhly it is a much poorer insulation material.

Closed cell gas expanded rubber has been produced and has found wide commercial acceptance because of its unique combination of desirable properties. By reason of its closed cell rubber structure, it is resilient, waterproof, possessed of good sound and heat insulating value, extremely light in weight and structurally strong. It is splendidly adapted for use in low cost housing, for example, since by itself it can be used to form walls and roofs without the use of other materials. The properties pointed out above enable it to completely replace the expensive and high labor cost materials such as brick used before in housing. Insulating construction elements in the form of slabs of the closed cell expanded rubber can be slid into friction and adhesive engagement with a grooved framework of steel or wood at a minimum of labor cost and time.

But this closed cell expanded rubber has hitherto been made and could only be made by the use of externally applied gas under high pressure, as for instance nitrogen under 3,000 lbs. per sq. in. The present commercial process of producing gas expanded rubber is set forth and covered in the Denton Patent 1,905,269. This process produces gas expanded closed cell rubber and employs an external application of nitrogen to the rubber of about 3,000 lbs. per square inch. The use of carbon dioxide gas has been attempted in this art because $CO_2$ has a greater solubility in rubber than nitrogen and lower pressures could be employed. But $CO_2$ because of this solubility in rubber and because of the low $CO_2$ content of the air surrounding the finished closed cell gas expanded rubber diffuses out from the finished product and causes collapse of the structure. For this reason satisfactory results could not be obtained and the Denton process using nitrogen at 3,000 lbs. per sq. in. has been used.

But the use of a high pressure such as 3,000 lbs. per sq. in. necessitates high pressure pumps and a gassing autoclave of tremendous strength. The gassing autoclave used in the Denton process costs about $5,000. Its maintenance is exceedingly high. Further, the gassing of rubber by external application of gas involves a period of time of about three to eight hours. The expensive pressure apparatus and autoclave are thus tied up for long periods of time at each gassing operation. This materially adds to the cost of production of the expanded rubber. The time element where expensive apparatus and labor are involved is most important in commercial processes.

Thus it can be seen that the prior method of manufacturing closed cell gas expanded rubber was costly both from a standpoint of pressure apparatus and time. For this reason the cost of the material has been relatively high and its universal acceptance has been retarded because of the competition of inferior but far cheaper substitutes.

We have discovered a new method of manufacturing closed cell gas expanded rubber employing an internal evolution of gas within the rubber coincident with such control of the rubber mix that the evolved gas is trapped in sealed or closed cells throughout the rubber and such evolved gas is prevented from permeating the rubber mass so as to form inter-communicating channels therein or escape from the mass to form a sponge rubber structure.

It is a primary purpose of our invention to make cell tight rubber by the internal development of gases within the rubber. This is effected by setting the tensile strength of the rubber always at such a point that the pressure of the internally developed gas is insufficient to rupture the rubber and escape from the particular spot where it is developed. The modulus of expansion of the rubber mix is an important factor in determining the necessary tensile strength.

We have discovered that by properly setting the physical condition of the rubber before or at the time of expansion we can cause the gas when evolved, to remain in sealed cells. When gas is evolved in a rubber mass, the nature of the cells produced is dependent upon the physical state of the rubber mass at the time of gas evolution. By properly controlling the acceleration and consequent vulcanization of the rubber or by varying the composition to govern its consistency under heat we may so control the physical state of the rubber that we may obtain a closed cell structure.

Plasticity as used herein means not only viscosity, but also elasticity or fiber strength of the rubber composition. It is a variable factor and depends upon the nature of the components of the mix as well as the external influences such as heat which are involved.

When vulcanized rubber is heated, it becomes extremely plastic and so may be considered as a thermoplastic material. At temperatures from 100° to 215° F. the rubber is a soft plastic with little tensile strength; as the temperature is raised above this point the material becomes increasingly soft so that at about 260° F. it might be considered a viscous liquid. However, when vulcanizing agents are present in the rubber, vulcanization starts to occur at temperatures from 240° F. to 280° F. depending upon the nature of the accelerator present and its corresponding effect on the speed of vulcanization. As vulcanized rubber is no longer a thermoplastic material, it is obvious that during the vulcanization of any rubber compound, although this plastic phase will tend to be present, it will be limited by the speed of vulcanization. Its exact nature, that is, the degree of softness reached, and the period of time it is permitted to effect the rubber mass depends upon the nature of the compounding ingredients and the vulcanizing agents employed as well as upon the prior treatment (noticeably the amount of mastication) of the rubber.

For instance, rubber compounds reinforced with materials such as carbon black, tend to avoid the plastic state, those compounded with oils or other softeners tend to have longer and softer plastic phase. Likewise prior mastication (which causes the rubber to become softer at lower temperatures) will tend to prolong the plastic phase. It it again obvious that accelerators which cause vulcanization to occur at relatively low temperatures will limit the plastic phase.

We have discovered that in the manufacture of expanded rubber this plastic phase is of primary importance. When an ingredient which is capable of generating gas at a temperature of 200° F. to 260° is mixed with a rubber compound and the compound heated to vulcanizing temperature, the gas which is evolved will behave in one of the following manners:

(1) If the rubber is in the extreme plastic state when gas is evolved the bubbles of gas formed, will bubble upwards and out of the viscous plastic mass thus effecting no structural change in the rubber mass.

(2) If vulcanization is proceeding at the same time, that gas evolution is obtained, the rubber mass will stiffen sufficiently to hold these inter-communicating cells and results is the common-known "sponge rubber."

(3) If the rubber mix is sufficiently firm or self sustaining, the gas when formed, will be trapped in closed cells.

This last 3 is the condition we wish to obtain and we do so in certain different ways.

Our invention consists in part in novel methods of controlling the plastic state of the rubber mix in order that the cells, when formed, will be sealed and not inter-communicating. In order to achieve this desirable result, we have found these several methods to be effective.

(a) We may cause prevulcanization to occur before gas is evolved so that the gas evolution of the incorporated chemical blowing agent follows the plastic state.

(b) We may reverse this and cause this gas evolution to occur at temperature lower than that necessary to reach the plastic state of the rubber mix and subsequently vulcanize by means of added gaseous accelerators without passing through the plastic state at all.

(c) We may, by use of proper compounding ingredients, dispense with the plastic state altogether. Thus by using quantities of rubber reclaim together with raw rubber, a rubber mix can be obtained that has such a consistency and strength that the evolved gas within the mass is trapped in the particular spot where it is developed and cannot permeate through the rubber.

(d) We have also found that, by maintaining a pressure of gas surrounding the rubber mix while the blowing agent contained therein is decomposed to evolve a gas, a closed cell gas expanded rubber may be produced.

These four reresentative methods of producing closed cell gas expanded rubber are set forth more specifically later in the specification under the same headings (a), (b), (c), (d).

Our processes are simple and do not involve long gassing periods. No costly high pressure apparatus is needed. Closed cell expanded rubber can be produced and sold at a competitive price range with hitherto cheaper and inferior substitutes.

An object of our invention is to produce a closed cell expanded rubber without the use of high pressure apparatus.

Another object of our invention is to produce by means of internally developed gases a closed cell gas expanded rubber.

Another object of our invention is a process for producing a closed cell expanded rubber using a gas developed internally.

Another object of our invention is a process of producing a closed cell expanded rubber by incorporating a gas forming material within a rubber dough and partially setting the rubber dough before causing a substantial expansion by gas.

A further object is to provide a novel process for the manufacturing of closed cell expanded rubber by means of gas forming ingredients and closely controlling the conditions of the rubber at the time of gas release and consequent expansion of the rubber to prevent escape of the gas.

Another object of our invention is to provide a process for the manufacture of a gas expanded rubber by means of an internal gas pressure generated by a nitrogen-bearing chemical.

Another object of our invention is to provide a process for the manufacture of a gas expanded rubber by means of controlling the fibre strength of the rubber mix before the internal pressure is released.

An object of our invention is to provide a process for the manufacture of a gas expanded rubber by controlling the tensile strength of the rubber which encloses each completely dispersed nitrogen-bearing chemical particle before decomposition of the same.

Another object of our invention is to provide a process for the manufacture of a gas expanded rubber in which carefully prepared nitrogen-bearing chemical is intimately dispersed similarly as a suspension in a colloid.

Another object of our invention is to prepare a nitrogen-bearing chemical in a neutral oil paste to facilitate uniform dispersion.

An object of our invention is to provide a process for the manufacture of a gas expanded rubber in which the release of gas pressure is at a temperature above a partial vulcanizing temperature used in increasing the fibre strength of cell walls.

To obtain our closed cell expanded rubber, we first take the ingredients listed below in, for example, the proportions cited:

Mix 1

| | Parts by weight |
|---|---|
| Rubber, crepe or smoked | 100 |
| Sulphur | 3 to 50 |
| Light calcined magnesia | 6 |
| Gilsonite | 25 |
| Diphenyl guanidine | 2 |
| Low melting bituminous substance (asphalt) | 25 |

Mix 2

| | Grams |
|---|---|
| Pale crepe | 62.5 |
| Reclaim | 375.0 |
| Sulphur | 7.5 |
| *Zenite A | 1.25 |
| Stearic acid | 2.5 |
| Zinc oxide | 10.0 |

*Zenite A is 97 parts of the zinc salt of mercaptobenzothiazole and 3 parts of tetramethylthiuramonosulphide.

The ingredients of Mix 1 are combined in this way. We first masticate the rubber thoroughly on hot rolls. We then incorporate in the rubber from 3 to 50 parts of sulphur, according to the hardness desired in the ultimate product. After the rubber is thoroughly masticated, we allow it to rest in a cool, dark chamber for a period of approximately 24 hours. We have found that such resting tends to restore to the rubber certain of its natural properties which have been destroyed or disturbed during the final working on the masticating rolls referred to above. It is believed that the disturbance of these properties is caused by the disarrangement of the molecular structure of the rubber, which structure is believed to be in a spiral or extended form. The violent working of the rubber on the rolls tends to throw this molecular arrangement off normal and the period of rest referred to above apparently allows the molecular arrangement to be regained. After this rest period we again work the rubber on the rolls and incorporate therein the calcined magnesia, the asphalt, and gilsonite to lend the desirable properties to the rubber structure. Diphenyl guanidine is added to obtain a partial set at a comparatively low temperature.

Similarly the ingredients of Mix 2 are compounded to form a rubber mix in the manner indicated above.

There is now incorporated in the rubber mix a chemical blowing agent adapted either by reaction or by the influence of heat to evolve a gas in the rubber dough which will develop a pressure therein and cause bubbles of gas to form and so expand the dough.

As blowing agents two different groups of chemicals present themselves as suitable:

I. Chemicals which react with other chemicals to produce a gas, and
II. Chemicals which decompose and evolve gas under the influence of certain effects, such as, for instance, heat.

As an example of Group I, we present two chemicals which react in the dough to produce nitrogen gas:

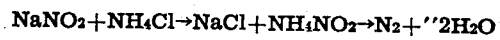
$NaNO_2 + NH_4Cl \rightarrow NaCl + NH_4NO_2 \rightarrow N_2 + 2H_2O$

As examples of Group II:

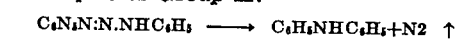
$C_6H_5N:N.NHC_6H_5 \longrightarrow C_6H_5NHC_6H_5 + N_2 \uparrow$

Diazoaminobenzene→explodes

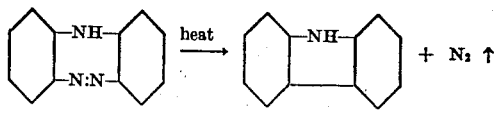

diazoaminomethane $CH_3.N:N.NH.CH_3 \xrightarrow{heat}$

$CH_3NHCH_3 + N_2 \uparrow$

The class of chemicals represented by Group II are preferred. In the first place, the point at which gases are evolved can be definitely controlled and the process of producing evolved gases within the rubber dough thus carefully regulated. These chemicals also produce violently a gas under pressure and for this reason can develop a greater blow in the rubber. Other chemicals which act under the influence of heat to produce a neutral gas may also be used. It is important to note that for the production of soft closed cell expanded rubber, a blowing agent should be used that will release nitrogen. If hard board closed cell gas expanded rubber is to be made, a blowing agent adapted to produce any suitable inert gas may be used. This is because soft expanded rubber has little structural strength and if the gas enclosed in the cells diffuses out, collapse will occur. Since nitrogen is both insoluble in rubber and present to a great extent in the air, there is little tendency for it to leak out. Hard board expanded rubber, on the other hand, has greater structural strength and is not likely to collapse even if the gas in the cells partially diffuses out.

Developing now more fully the four suggested methods (a), (b), (c), (d) of obtaining a closed cell structure previously set forth, we shall discuss (a) A rubber mix, with the proper ingredients, as for example those set forth in "Mix 1," is thoroughly and homogeneously permeated with a chemical blowing agent adapted to evolve gas at a particular temperature. The chemical blowing agent should be ground fine as, for example, by means of a ball mill. A neutral oil such as paraffin can be employed to carry the chemical into the rubber. It is of extreme importance that it be dispersed in a fine condition throughout the rubber.

The rubber mix, with the chemical blowing agent now properly dispersed therein is then partially vulcanized at a temperature which is below that which would cause the blowing agent to decompose to evolve gas. This can be accomplished by using a low temperature accelerator which will cause a partial vulcanization (the degree of vulcanization can be controlled to obtain a partial set by different influences, as example, time) at the desired temperature below the decomposition point of the chemical blowing agent.

After the rubber mix is given a partial set, it is subjected to a higher temperature to effect the decomposition of the chemical blowing agent.

The chemical blowing agent, for example diazoaminobenzene, is in a colloidal state throughout the rubber mass. The proper temperature causes microscopic explosions of these colloidal particles producing a volume of gas far in excess of the solid chemical from which the gas is evolved.

Another method of obtaining the same result consists in placing the uncured rubber dough mix with the ingredients indicated above in a mold which closely confines it. It is then subjected to heat at a temperature which would ordinarily cause evolution of the gases. However, by reason of its inclosure in the mold the gases are prevented from evolving and a partial vulcanization or set is obtained without evolution of gas.

(b) A rubber mix with the ingredients, as for example, those set forth in Mix 1 is masticated for a substantially short period of time so that the consistency of the mass is maintained fairly stiff and the rubber mix has thereupon a high softening point. The evolution of the gases then takes place under heat in a self-sustaining rubber mass that prevents the escape of the gas to form channels and ultimately sponge rubber. After the evolution of gases has taken place, and expansion has progressed to a desired volume, rapid acceleration is induced as for example, by a gaseous agent such as ammonia and a quick conversion in the final vulcanized state is obtained without the rubber having passed through a softened stage.

(c) As a further method of carrying out the principles of our invention, we may by incorporating proper compounding ingredients, as for example, quantities of reclaimed rubber dispense with the undesired soft plastic state altogether. A specific example of such a rubber mix is set forth under "Mix 2." The rubber reclaim being already vulcanized in its prior manufacture does not soften under the heat that is applied to cause the evolution of the gas. Thus, the evolution of the gases again takes place in a stiff fairly self-sustaining mass and the gases are entrapped in closed cells throughout the rubber mass and can not escape to form inter-communicating channels and a consequent sponge structure. The inherent value of this particular process lies in the use of quantities of rubber reclaim in place of the conventional raw rubber. Rubber reclaim is not affected by heat in the same way that raw rubber is inasmuch as raw rubber is purely a thermoplastic material and rubber reclaim is not.

(d) Another method of producing closed cell gas expanded rubber consists in incorporating with the rubber mix a chemical blowing agent such as ammonium carbonate adapted to release carbon dioxide upon decomposition. The rubber mix with the chemical blowing agent incorporated therein is placed in a chamber and in that chamber is subjected to an atmosphere of carbon dioxide under a low pressure, as for example, 50 lbs. per sq. in. The rubber mix with the included blowing agent is then subjected to heat which acts to decompose the blowing agent and release carbon dioxide. The carbon dioxide permeates and expands the rubber. The surrounding atmosphere of the carbon dioxide gas under pressure acts to prevent a rapid expansion of the rubber such as normally would take place because, as the volume of rubber increases from internal expansion, the surface pressure of the external carbon dioxide on the rubber becomes greater. The gassed rubber containing the carbon dioxide in closed cells now reaches a semihard condition. The external pressure of carbon dioxide is then released down to one atmosphere and the rubber is then subjected to a mold to further heat which acts to expand the gas and therefore the rubber. When the proper volume of expansion has been reached the heat is still further increased to vulcanize it to a hard rubber.

Again the object of this particular method is to prevent the evolved gas of the chemical blowing agent from rupturing the rubber walls of the cells in which it is developed to form intercommunicating channels and the resultant sponge rubber. The external pressure of the gas prevents such expansion as would exceed the tensile strength of the rubber and cause the undesired rupture. This example illustrates the formation of hard expanded rubber board by the use of carbon dioxide.

We have also employed other gases, as for example, nitrogen and made soft rubber using the same principle above set forth. We have found it preferable to use, as the externally applied gas to produce a gas pressure surrounding the rubber, the same gas that is developed within the rubber mix to expand the rubber.

Thus the desired condition of consistency of the rubber mix can be obtained simply by carefully controlling the nature of the ingredients of the mix.

The control of the temperature point at which gases are evolved is of extreme importance with respect to our process. As has been indicated herebefore, the success or failure in producing closed cell structure depends on the consistency of the mass at the time when the gas is evolved. The mass must be sufficiently firm so that the gas cannot permeate throughout and form channels or escape entirely. On the other hand it must not be so firm that the desired high expansion will be inhibited. The chemical blowing agent should therefore be of such a nature that it will decompose to evolve gases at a known temperature. Thus the consistency of the mass can be accurately set at the desired condition when the gases are evolved by the chemical blowing agent. It is upon this condition that the success of this process depends.

The rubber is therefore gassed by the evolution of gas from the contained chemical blowing agents, while it is maintained at a consistency designed to entrap the evolved gas in closed cells therein. It is then subjected to the influence of heat. The heat acts to expand the entrapped gas, thus producing an expansion of the rubber. This rubber expansion can be controlled by the use of suitably shaped molds to obtain exactly the desired shape and volume, or by the use of more or less heat to obtain more or less expansion.

Obviously, the steps of expansion and shaping can be taken in as many different steps as is practical from a manufacturing viewpoint.

To obtain enhanced expansion far beyond the ordinary expansion due to the heating of the gases contained within the rubber dough, we can subject the gas containing the mass of rubber to the action of vacuum or reduced pressure.

As a modification of our process in order to develop gas internally within the rubber, we may avail ourselves of the use of charcoal. Small particles of charcoal are subjected to a vacuum in order to draw off any gases or air contained therein. After the charcoal has been thoroughly evacuated we subject it to the influence of a gas, such as nitrogen, carbon dioxide, helium, etc. The charcoal, by reason of its absorptive nature, takes up the gas and holds it. The charcoal is then kept in a cool state and subsequently mixed with rubber dough. To facilitate the admixture of the charcoal particles to the rubber dough, we may use an oil, such as petroleum. When a mixture of rubber dough and charcoal containing gas is subjected to heat, the gas is occluded from the charcoal and expands the rubber.

In connection with this manner of introducing gas into a rubber mixture, we call attention to the fact that charcoal here serves a double purpose. The rubber mass may be caused to be heated by means of a high frequency electric current or by the electrical resistance of the mass to an electric current. In such a situation, the charcoal acts as a means to develop heat within the mass, the action of the electricity upon the particles of charcoal being similar to the action of electricity on a carbon electrode.

The use of electrical heating in developing heat within the rubber dough to cause evolution of gas from heat-decomposable materials has many new and unexpected advantages. The use of electricity to develop heat within the gas, in contrast to the old method of directing either a radiant or conductive heat on to the rubber dough, has unusual advantages. A completely uniform heating throughout the mass is achieved, whereby a complete decomposition of the gas forming materials which have been homogeneously distributed throughout the mass is achieved. It has been found that when radiant or conductive heat, the usual methods of heating, are employed, there is an irregular curing of the rubber dough, the external portions being over-cured and the internal portions being under-cured. Further, the gas developing materials farthest from the surface have been insufficiently activated. The high frequency heating above noted assures a completely uniform cure and a completely uniform development of gas throughout the material, thus assuring a final structure of perfectly homogeneous sealed closed cell structure.

In a further modification of our process we take solid carbon dioxide and reduce it to the form of small particles by a suitable breaking-up means. We then incorporate these small particles of solid carbon dioxide in the rubber dough of the composition outlined above and subject the dough to heat. The heat causes the solid carbon dioxide to vaporize and the gas developed within the rubber dough causes a terrific blow. In order that the particles of solid carbon dioxide should not detrimentally release carbon dioxide gas during the mixing operation these small particles of carbon dioxide are preferably coated with a composition adapted to prevent them from vaporizing during the operation of mixing them with the rubber.

We have also discovered that certain heavy oils, which expand or vaporize under the influence of heat, as for example, the heat developed in a vulcanizing process, can be incorporated in a rubber mix to produce a soft expanded cell tight rubber material. Many oils, as for example paraffin oil, had been found suitable for use in this connection. When incorporated in the rubber and thoroughly mixed therewith, the oil expands and vaporizes under the influence of the high temperatures of vulcanization and produces a desirable blow in the rubber. A rather heavy closed cell soft rubber is produced that in many ways has desirable properties.

These oils may be used either alone or in composition with other chemical blow agents.

Suitable modifying agents to impart desired characteristics to the expanded rubber may be incorporated during the mixture stage. For example: condensation products of phenol formaldehyde resin add strength to the finished structure and improve the impermeability of the closed cells. Similarly, chlorinated and hydrochlorinated rubber may be used as well as synthetic resins, such as acrylic acid ester resins and substituted acrylic acid ester resins, such as the aliphatic esters of methacrylic acid. Further, vinyl compounds, such for example, as vinyl acetate and vinyl chloride may be incorporated to lend desirable characteristics to the finished products.

Other modifiers such as materials of a bituminous nature have been found to be compatible with rubber and greatly reduce the cost of the raw material.

Certain of the above-mentioned plastics can be used to the complete exclusion of rubber since the principles of our invention as set forth herein relate broadly to plastics and not only specifically to rubber.

We have also discovered that hydrogen sulphide gas can be developed within the rubber to expand it per se without an additional blowing agent. We have found that with the employment of high temperatures on the order of 330° F. or more, and a rubber mix with specially low thermal conductivity there will be developed by the exothermic reaction within the rubber, a hydrogen sulphide gas which acts to blow the rubber. The temperature within the mass in developing the hydrogen sulphide gas blow is much higher than the unit in which it is being treated because of the exothermic reaction. The hydrogen sulphide blow developed as here indicated can be used in conjunction with proper fibre strength control to produce a closed cell gas expanded rubber. Without this control a sponge rubber results.

We have also found that certain chemical blowing agents which are adapted to decompose or to react under the influence of heat have further unusual properties with respect to the rubber. For example, diazoaminobenzene, the use of which as a chemical blowing agent has been fully explained hereinbefore, has the added property of leaving throughout the rubber mass certain amino compounds which are of an anti-oxidant nature. Thus, in addition to evolving nitrogen by the decomposition of the diazoaminobenzene, certain auxiliary compounds are formed which give of the rubber desirable improved properties.

Along this same line, we have found that certain chemical blowing agents can be employed which release gases such as chlorine which act not only to expand the rubber to produce the desired cell tight gas expanded structure but also chemically alter the rubber to form an altered isoprene molecule such as substituted or added chlor-isoprene. Compounds suitable for this purpose would be chlorine containing compounds adapted to decompose or react to evolve quantities of chlorine gas. Similarly compounds which react or decompose to produce hydrogen chloride gas can also be employed to produce gas expanded rubber hydrochloride.

Another method we have found of making cell tight expanded rubber by internally developed gas comprises combining with rubber approximately $\frac{1}{10}$ or a similar low fraction of sulphur necessary to effect a complete vulcanization of the rubber. The other usual modifying agents are incorporated with the rubber and the mix subjected to heat for a sufficient time to effect a combination of all the sulphur present with the rubber. When this has been effected, we have a rubber composition that has been partially vulcanized by means of the tenth part or other similar fractional amount of the ordinary vulcanizing sulphur. After this controlled partial vulcanization has been effected, the partially vulcanized rubber is combined with the chemical blowing agent and the remaining sulphur on suitable mixing rolls. When the so mixed rubber compound is subjected to heat which effects an evolution of gas from the chemical blowing agent, the partially vulcanized rubber has sufficient fiber strength to entrap the evolved gas within the rubber without permitting it to travel around in channels through the rubber or escape from the mass. Further heat acts to expand the rubber and effect a combination of the additional sulphur to finally effect a complete vulcanization.

Since the products of our novel process have a far lower cost of manufacture than the closed cell gas expanded rubber produced by the external application of gas, many fields hitherto difficult to invade because of price competition have been opened.

We claim:

1. A method of forming a vulcanized cellular rubber product which comprises generating an inflating gas within the body of the rubber material to be expanded, while subjecting the mass to gaseous counter-pressure of a magnitude which will permit substantial expansion of the mass but which will prevent rupture of the cellular structure during the generation of the inflating gas, and subsequently reducing the counter-pressure whereby to effect further expansion of the mass and then completing vulcanization of the rubber while closely confined in a mold under conditions preventing loss of inflating gas.

2. In the process of making gas expanded rubber, the steps of incorporating in the mix to be expanded diazoaminobenzene which upon application of heat decomposes and generates nitrogen gas, partially vulcanizing the rubber at a temperature below the decomposition temperature of the diazoaminobenzene, raising the temperature to a point at which gas is evolved, and permitting the mix to expand under the action of the generated gas.

3. In the process of making gas expanded rubber, the steps of incorporating in the mix to be expanded diazoaminobenzene which upon application of heat decomposes and generates nitrogen gas, raising the temperature to a point at which gas is evolved, restraining the rubber from expanding under the action of the evolved gas, and releasing the rubber from restraint against expansion.

4. In the process of making gas expanded rubber, the steps of incorporating in the mix to be expanded diazoaminobenzene which upon application of heat decomposes and generates nitrogen gas, controlling the temperature point at which gases are evolved to a temperature at which the consistency of the mix is sufficiently firm so that the gas cannot permeate throughout and form channels but is not so firm that the desired expansion is inhibited, and permitting the mix to expand under the action of the generated gas.

5. In the process of making hard gas expanded rubber, the steps of incorporating approximately 50% sulphur by weight of the rubber employed in the mix, incorporating in the mix ammonium carbonate, partially vulcanizing the rubber at a temperature below the decomposition temperature of the ammonium carbonate, raising the temperature to a point at which gas is evolved, and permitting the mix to expand under the action of the generated gas.

6. In the process of making hard gas expanded rubber, the steps of incorporating approximately 50% sulphur by weight of the rubber employed in the mix, incorporating in the mix ammonium carbonate, controlling the temperature point at which gases are evolved to a temperature at which the consistency of the mix is sufficiently firm so that the gas cannot permeate throughout and form channels but is not so firm that the desired expansion is inhibited, and permitting the mix to expand under the action of the generated gas.

7. In the process of making hard gas expanded rubber, the steps of incorporating approximately 50% sulphur by weight of the rubber employed in the mix, incorporating a carbon dioxide generating chemical in the mix, partially vulcanizing the rubber at a temperature below the gas generating temperature of the chemical, raising the temperature to a point at which gas is evolved, and restraining the rubber from expanding under the action of the evolved gas.

8. In the process of making gas expanded rubber, the steps of incorporating a low temperature vulcanizer in the mix to be expanded, incorporating in the mix to be expanded diazoaminobenzene which upon application of heat decomposes and generates nitrogen gas, partially vulcanizing the rubber at a temperature below the decomposition temperature of the diazoaminobenzene, raising the temperature to a point at which gas is evolved, and restraining the rubber from expanding under the action of the evolved gas.

9. In the process of making gas expanded rubber, the steps of incorporating sulphur in the mix to be expanded, incorporating calcined magnesia, asphalt and gilsonite in the mix, incorporating a low temperature accelerator, incorporating a chemical blowing agent which by reaction under the action of heat evolves gas, partially vulcanizing the rubber at a temperature below the gas generating temperature of the chemical blowing agent, raising the temperature to a point at which gas is evolved, and permitting the mix to expand under the action of the generated gas.

10. In the process of making gas expanded rubber, the steps of incorporating sulphur in the mix to be expanded, incorporating calcined magnesia, asphalt and gilsonite in the mix, incorporating a low temperature accelerator, incorporating a chemical blowing agent which by reaction under the action of heat evolves gas, controlling the temperature point at which gases are evolved to a temperature at which the consistency of the mix is sufficiently firm so that the gas cannot permeate throughout and form channels but is not so firm that the desired expansion is inhibited, and permitting the mix to expand under the action of the generated gas.

11. In the process of making gas expanded rubber, the steps of masticating the untreated mix, incorporating sulphur in the mix, resting the rubber to restore the rubber to its natural properties, incorporating calcined magnesia, asphalt and gilsonite in the mix, incorporating diphenyl guanidine to produce a comparatively low temperature in partial set, incorporating a chemical blowing agent which by reaction under the action of heat evolves gas, partially vulcanizing the rubber at a temperature below the reaction temperature of the chemical blowing agent, raising the temperature to a point at which gas is evolved, and permitting the mix to expand under the action of the generated gas.

12. In the process of making gas expanded rubber, the steps of incorporating sulphur in the mix, incorporating calcined magnesia, asphalt and gilsonite in the mix, incorporating a low temperature accelerator, incorporating a chemical blowing agent which by decomposition under the action of heat evolves gas, partially vulcanizing the rubber at a temperature below the decomposition temperature of the chemical blowing agent, raising the temperature to a point at which gas is evolved, and permitting the mix to expand under the action of the generated gas.

13. In the process of making gas expanded rubber, the steps of incorporating sulphur in the mix, incorporating calcined magnesia, asphalt and gilsonite in the mix, incorporating a low temperature accelerator, incorporating a chemical blowing agent which by decomposition under the action of heat evolves gas, controlling the temperature point at which gases are evolved to a temperature at which the consistency of the mix is sufficiently firm so that the gas cannot permeate throughout and form channels but is not so firm that the desired expansion is inhibited, and permitting the mix to expand under the action of the generated gas.

14. In the process of making gas expanded rubber, the steps of incorporating a low temperature vulcanizer in the mix to be expanded, incorporating in the mix to be expanded diazoaminobenzene which upon application of heat decomposes and generates nitrogen gas, partially vulcanizing the rubber at a temperature below the decomposition temperature of the diazoaminobenzene, raising the temperature to a point at which gas is evolved, restraining the rubber from expanding under the action of the evolved gas, releasing the rubber to permit expansion, and subjecting the mix to the influence of further heat to expand the entrapped gas.

15. In the process of making gas expanded rubber, the steps of incorporating in the mix to be expanded diazoaminobenzene which upon application of heat decomposes and generates nitrogen gas, partially vulcanizing the rubber at a temperature below the decomposition temperature of the diazoaminobenzene, raising the temperature to a point at which gas is evolved, and permitting the mix to expand under the action of the generated gas, the heat being supplied by means of an electric current.

16. In the process of making gas expanded rubber, the steps of incorporating a low temperature vulcanizer in the mix to be expanded, incorporating in the mix to be expanded diazoaminobenzene which upon application of heat decomposes and generates nitrogen gas, controlling the temperature point at which gases are evolved to a temperature at which the consistency of the mix is sufficiently firm so that the gas cannot permeate throughout and form channels but is not so firm that the desired expansion is inhibited, and permitting the mix to expand under the action of the generated gas.

17. In the process of making gas expanded rubber, the steps of incorporating occluded charcoal in the rubber mix, incorporating a low temperature accelerator in the mix to be expanded, incorporating in the mix to be expanded diazoaminobenzene which upon application of heat decomposes and generates nitrogen gas, partially vulcanizing the rubber at a temperature below the decomposition temperature of the diazoaminobenzene, raising the temperature to a point at which gas is evolved, and restraining the rubber from expanding under the action of the evolved gas.

18. In the process of making gas expanded rubber, the steps of incorporating sulphur in the mix, incorporating calcined magnesia, asphalt and gilsonite in the mix, incorporating a low temperature accelerator, incorporating a chemical which by the application of heat generates a blowing gas, partially vulcanizing the rubber at a temperature below the gas generating temperature of the chemical, raising the temperature to a point at which gas is evolved, and permitting the mix to expand under the action of the generated gas.

19. In the process of making gas expanded rubber, the steps of incorporating in the mix to be expanded diazoaminobenzene which upon application of heat decomposes and generates nitrogen gas and produces amino compounds, controlling the temperature point at which gases are evolved to a temperature at which the consistency of the mix is sufficiently firm so that the gas cannot permeate throughout and form channels but is not so firm that the desired expansion is inhibited, and permitting the mix to expand under the action of the generated gas.

20. In the process of making gas expanded rubber, the steps of incorporating in the mix to be expanded diazoaminobenzene which has first been ground fine to ensure dispersion in a fine colloidal condition throughout the rubber and which upon application of heat decomposes and generates nitrogen gas, raising the temperature to a point at which gas is evolved, restraining the rubber from expanding under the action of the evolved gas, and releasing the rubber from restraint against expansion.

DUDLEY ROBERTS.
ROGER CHARLES BASCOM.
LESTER COOPER.